(12) United States Patent
Kohler et al.

(10) Patent No.: US 8,648,159 B2
(45) Date of Patent: Feb. 11, 2014

(54) CROSSLINKABLE VINYL ESTER COPOLYMERS AND THEIR USE AS LOW-PROFILE ADDITIVES

(75) Inventors: Thomas Kohler, Kastl (DE); Rene Grawe, Landshut (DE)

(73) Assignee: Wacker Chemie AG, München (DE)

( * ) Notice: Subject to any disclaimer, the term of this patent is extended or adjusted under 35 U.S.C. 154(b) by 431 days.

(21) Appl. No.: 12/745,440

(22) PCT Filed: Dec. 1, 2008

(86) PCT No.: PCT/EP2008/066527
§ 371 (c)(1),
(2), (4) Date: May 28, 2010

(87) PCT Pub. No.: WO2009/071506
PCT Pub. Date: Jun. 11, 2009

(65) Prior Publication Data
US 2010/0273934 A1    Oct. 28, 2010

(30) Foreign Application Priority Data
Dec. 3, 2007 (DE) .......................... 10 2007 055 694

(51) Int. Cl.
*C08L 33/04* (2006.01)
*C08F 124/00* (2006.01)

(52) U.S. Cl.
USPC ............................ 526/266; 524/556; 526/273

(58) Field of Classification Search
USPC .................................. 526/266, 273; 524/556
See application file for complete search history.

(56) References Cited

U.S. PATENT DOCUMENTS

| | | | |
|---|---|---|---|
| 3,317,453 A | 5/1967 | MacDonald et al. | |
| 3,579,490 A | 5/1971 | Kordzinski et al. | |
| 3,616,364 A * | 10/1971 | D'Alelio | 522/59 |
| 4,618,658 A | 10/1986 | Hefner et al. | |
| 4,716,080 A | 12/1987 | Lewin | |
| 5,484,850 A * | 1/1996 | Kempter et al. | 525/286 |
| 5,763,546 A | 6/1998 | Jung et al. | |
| 7,122,595 B1 * | 10/2006 | Ott et al. | 524/502 |

FOREIGN PATENT DOCUMENTS

| | | |
|---|---|---|
| DE | 1932715 A | 2/1970 |
| EP | 0351831 A | 1/1990 |
| EP | 0506703 B | 6/1994 |
| EP | 0897376 B | 1/2002 |
| EP | 1682591 B | 8/2008 |
| GB | 1155498 A | 6/1969 |
| GB | 1174391 A | 12/1969 |
| GB | 1264552 A | 2/1972 |
| GB | 1456412 A | 11/1976 |
| JP | 04325531 A | 11/1992 |
| JP | 08221738 A | 8/1996 |

OTHER PUBLICATIONS

Giani, Elena; "International Search Report"; Nov. 3, 2009; 2 pp; European Patent Office, Rijswijk, The Netherlands.

* cited by examiner

*Primary Examiner* — Ling Choi
*Assistant Examiner* — Chun-Cheng Wang
(74) *Attorney, Agent, or Firm* — RatnerPrestia

(57) ABSTRACT

The invention relates to cross-linkable vinylester-copolymers obtained by means of radically initiated polymerisation of a) one or more vinyl esters and b) one or more ethylenically unsaturated, epoxy functional monomers, and by a subsequent reaction that is analogous to polymerisation of the thus obtained base polymers with one or more ethylenically unsaturated acids g), such that at least one ethylenically unsaturated, polymerizable group is introduced into each base polymer. Said invention is characterised in that the cross-linkable vinylester-copolymers have molecular weights of Mn of ≥6.500 g/mol.

14 Claims, No Drawings

CROSSLINKABLE VINYL ESTER COPOLYMERS AND THEIR USE AS LOW-PROFILE ADDITIVES

CROSS REFERENCE TO RELATED APPLICATIONS

This application is the national stage filing of PCT application number EP2008/066527, filed Dec. 1, 2008, and claims priority of German patent application number 102007055694.4, filed Dec. 3, 2007, the entireties of which applications are incorporated herein by reference.

FIELD OF THE INVENTION

The invention relates to crosslinkable vinyl ester copolymers, to processes for their preparation, and also to their use by way of example as coating compositions and in particular as low-profile additives (LPAs).

BACKGROUND OF THE INVENTION

Crosslinkable vinyl ester copolymers are polymers based on ethylenically unsaturated vinyl ester monomers and on other ethylenically unsaturated monomers having additional functional groups which, directly or indirectly after transformation, have suitability for the crosslinking reaction. Vinyl ester copolymers are usually prepared via free-radical-initiated polymerization, by the emulsion polymerization process.

Crosslinkable vinyl ester copolymers are used in various application sectors. By way of example, JP-A 04325531 describes the use of ethylene-vinyl acetate-glycidyl methacrylate terpolymers with from 2 to 20% by weight content of glycidyl methacrylate in protective films of solar cells. EP-A 0897376 and U.S. Pat. No. 4,716,080 propose vinyl acetate glycidyl methacrylate copolymers as size for glass fibers. JP-A 08221738 mentions vinyl chloride-vinyl acetate-glycidyl methacrylate copolymers inter alia as coating compositions for magnetic tapes.

GB-A 1456412 describes terpolymers based on vinyl acetate, on (meth)acrylic esters, and on from 0.1 to 2% by weight of ethylenically unsaturated epoxides, these being converted into pressure-sensitive adhesives (also known by the abbreviation PSA), via hardening with phosphoric acid or with phosphoric esters. U.S. Pat. No. 3,579,490 describes copolymers which can likewise be used as PSA and which are obtained via the solution polymerization or emulsion polymerization of ethylenically unsaturated monomers, such as (meth)acrylic esters and from 0.5 to 15% by weight of, for example, glycidyl crylate or allyl glycidyl ether, and also, if appropriate, vinyl acetate and/or acrylic acid. The Tg of the copolymers is from −15 to −65° C. Self-crosslinking copolymers are described in U.S. Pat. No. 3,317,453. These are obtained via solution polymerization of vinyl acetate with 5 mol % of, respectively, acrylic acid and glycidyl methacrylate, and can be crosslinked in the presence of a catalyst, for example a titanium species, within a period of 5 minutes at 90° C. to give a film.

EP-A 1682591 discloses soluble vinyl polymers composed of monounsaturated monomers and of polyunsaturated monomers, where the monomers are intended to be insoluble in organic solvents. Cyclodextrins are used to form complexes with the polyunsaturated monomers, which are then copolymerized with the monounsaturated monomers.

DE-A 1932715 discloses vinyl polymers which were obtained via polymer-analogous reaction of partially hydrolyzed polyvinyl acetate with acyl halides of acrylic acid derivatives, where from 20 to 95% of the hydroxyl groups were reacted and the resultant vinyl polymers contain from 0.3 to 7.0 unsaturated acid units per 1000 molecular weight units. However, the crosslinkable, ethylenically unsaturated groups have direct bonding by way of an ester group to the main chain of the vinyl polymers, and are thus difficult to access for crosslinking using ethylenically unsaturated groups of other vinyl polymers, with a resultant adverse effect on the crosslinking rate. The vinyl polymers are cured on phosphatized steel, using electron beams, together with (meth)acrylates or styrene, as a constituent of paint compositions.

EP-A 0506703 describes crosslinkable copolymers which are obtainable via polymer-analogous reactions of suitably functionalized vinyl ester-vinylaromatic copolymers with ethylenically unsaturated, functionalized monomers. The resultant crosslinkable copolymers have molar masses Mn of from 1500 to 6000 g/mol and are suitable by way of example for use in coating compositions for repair paints for motor vehicles. However, copolymers with such low molar masses Mn often do not have the mechanical properties desired in many applications, examples being high abrasion resistance, high mechanical flexural and tensile strength, or high elasticity, and have an increased tendency toward migration in coatings. The vinyl ester-vinylaromatic copolymers moreover comprise very large amounts of unpolymerized monomers (residual monomers), these being markedly above 5% by weight, based on the vinyl ester content of the copolymers. When the copolymers are used by way of example in the production of coatings, the residual monomers can lead to flow problems and moreover can cause pollution of the environment with volatile organic substances.

SUMMARY OF THE INVENTION

Against this background, an object was to provide crosslinkable vinyl ester copolymers which have an improved mechanical property profile and which, despite high reactivities, are storage-stable with respect to crosslinking, and also to provide processes for their preparation. The crosslinkable vinyl ester copolymers should in particular be suitable for use as LPAs.

DETAILED DESCRIPTION OF THE INVENTION

The object has been achieved using crosslinkable vinyl ester copolymers with molar masses Mn of ≥6500 g/mol, which were obtained via polymer-analogous reaction of epoxy-substituted vinyl ester parent polymers with ethylenically unsaturated acids, thus introducing crosslinkable, ethylenically unsaturated groups into the polymer. The high molar masses Mn give the crosslinkable vinyl ester copolymers advantageous mechanical properties. There is moreover one monomer unit separating the crosslinkable, ethylenically unsaturated groups from the main chain of the crosslinkable vinyl ester copolymers, namely the parent polymer units previously bearing epoxy groups. The result of this in combination with the high molar masses Mn is very high crosslinking rates and thus rapid hardening capability of the crosslinkable vinyl ester copolymers. Surprisingly, the crosslinkable copolymers are storage-stable, despite their rapid hardening capability. Specifically, in crosslinkable polymers with high molar masses Mn, even small degrees of crosslinking lead to haze or gelling or even to undesired hardening during storage.

The invention therefore provides crosslinkable vinyl ester copolymers obtainable by means of free-radical-initiated polymerization of a) one or more vinyl esters and
b) one or more ethylenically unsaturated, epoxy-functional monomers, and subsequent polymer-analogous reaction of the resultant parent polymers with one or more ethylenically unsaturated acids g), so that at least one ethylenically unsaturated, polymerizable group is introduced per parent polymer, wherein the molecular weights Mn of the crosslinkable vinyl ester copolymers are ≥6500 g/mol.

The molar masses Mn of the crosslinkable vinyl ester copolymers are preferably from 6500 to 300 000 g/mol, particularly preferably from 10 000 to 100 000 g/mol, and most preferably from 15 000 to 80 000 g/mol. The data relating to the molar masses Mn are based on the method of determination by means of SEC ("Size Exclusion Chromatography") using a polystyrene standard in THF at 60° C.

The vinyl ester(s) a) used in the polymerization reaction preferably comprise(s) one or more vinyl ester(s) of unbranched or branched alkyl carboxylic acids having from 1 to 20 carbon atoms. Particularly preferred vinyl esters are vinyl esters of unbranched or branched carboxylic acids having from 1 to 15 carbon atoms. Examples of particularly preferred vinyl esters are vinyl acetate, vinyl propionate, vinyl butyrate, vinyl 2-ethylhexanoate, vinyl laurate, 1-methylvinyl acetate, and vinyl esters of α-branched monocarboxylic acids having from 5 to 13 carbon atoms, such as vinyl pivalate, VeoVa9®, VeoVa10® or VeoVa11® (trademarks of Hexion). Most preference is given to vinyl acetate, vinyl pivalate, vinyl laurate, VeoVa9®, and VeoVa10®.

It is preferable to use from 15 to 99.9% by weight of vinyl ester(s) a), particularly preferably from 20 to 99% by weight, based in each case on the total weight of the monomers for the preparation of the parent polymers.

The ethylenically unsaturated, epoxy-functional monomers b) preferably have from 1 to 20 carbon atoms, particularly preferably from 1 to 10 carbon atoms, and the arrangement of these can be linear or branched, open-chain or cyclic.

Examples of preferred ethylenically unsaturated, epoxy-functional monomers b) are glycidyl acrylate, glycidyl methacrylate (GMA), or allyl glycidyl ether; glycidyl acrylate and glycidyl methacrylate are particularly preferred; glycidyl methacrylate is most preferred.

The amount of ethylenically unsaturated, epoxy-functional monomers b) used is preferably from 0.1 to 20% by weight, and with particular preference from 0.2 to 15% by weight, based in each case on the total weight of the monomers for the preparation of the parent polymers.

Additional monomers that can be copolymerized for the preparation of the parent polymers are one or more ethylenically unsaturated monomers c). Suitable monomers c) are selected from the group consisting of acrylic esters and methacrylic esters of unbranched or branched alcohols having from 1 to 20 carbon atoms, vinylaromatics, olefins, dienes, and vinyl halides.

Preferred monomers c) from the group of the esters of acrylic to acid or methacrylic acid are esters of unbranched or branched alcohols having from 1 to 15 carbon atoms. Particularly preferred acrylic esters or methacrylic esters are methyl acrylate, methyl methacrylate, ethyl acrylate, ethyl methacrylate, propyl acrylate, propyl methacrylate, n-, iso-, and tert-butyl acrylate, n-, iso-, and tert-butyl methacrylate, 2-ethylhexyl acrylate, norbornyl acrylate, isobornyl acrylate, stearyl acrylate. The most preferred acrylic esters or methacrylic esters are methyl acrylate, ethyl acrylate, methyl methacrylate, n-, iso-, and tert-butyl acrylate, 2-ethylhexyl acrylate, and isobornyl acrylate.

Preferred dienes are 1,3-butadiene and isoprene. Preferred olefins are ethene and propene. Preferred vinyl halides are vinyl chloride, vinylidene chloride, or vinyl fluoride, and particular preference is given to vinyl chloride. Preferred vinylaromatics are styrene and vinyltoluene. However, it is preferable that the preparation of the parent polymers uses no vinylaromatics as comonomers. Particularly when the polymerization is conducted in the absence of vinylaromatics, parent polymers with low contents of residual monomers are obtained.

It is preferable to use from 0 to 70% by weight, particularly from 2 to 50% by weight, of ethylenically unsaturated monomers c), based in each case on the total weight of the monomers for the preparation of the parent polymers.

Additional monomers that can also be copolymerized in preparing the parent polymers are one or more ethylenically unsaturated monomers d). Examples of monomers d) are ethylenically unsaturated mono- and dicarboxylic acids or their salts, preferably crotonic acid, acrylic acid, methacrylic acid, fumaric acid, or maleic acid; mono- and diesters of fumaric acid or of maleic acid, preferably the ethyl or isopropyl ester thereof; ethylenically unsaturated sulfonic acids or their salts, preferably vinylsulfonic acid, 2-acrylamido-2-methylpropanesulfonic acid; ethylenically unsaturated alcohols, preferably 2-hydroxyethyl acrylate, hydroxypropyl acrylate, 2-hydroxyethyl methacrylate, hydroxypropyl methacrylate, or glycerol 1-allyl ether; ethylenically unsaturated primary, secondary, or tertiary amines, preferably 2-dimethylaminoethyl methacrylate, 2-tert-butylaminoethyl methacrylate, allyl N-(2-aminoethyl)carbamate hydrochloride, allyl N-(6-aminohexyl)carbamate hydrochloride, allyl N-(3-aminopropyl) hydrochloride, allylamine, or vinylpyridine; ethylenically unsaturated amides, preferably 3-dimethylaminopropyl-methacrylamide, 3-trimethylammoniumpropyl-methacrylamide chloride; phosphonic acids or their salts, preferably vinylphosphonic acid, SIPOMER PAM-100® or SIPOMER-200® (trade name of Rhodia).

Particularly preferred monomers d) are crotonic acid, acrylic acid, methacrylic acid, 2-hydroxyethyl acrylate, and 2-hydroxy-ethyl methacrylate.

It is preferable to use from 0 to 20% by weight of monomers d), particularly from 0 to 15% by weight, based in each case on the total weight of the monomers for the preparation of the parent polymers.

Additional monomers that can also be copolymerized for the preparation of the parent polymers are one or more ethylenically unsaturated monomers e). Preferred monomers e) are ethylenically unsaturated isocyanates, preferably 1-(isocyanato-1-methyl)-3-(methylethyl)benzene, or ethylenically unsaturated anhydrides, preferably maleic anhydride.

One particularly preferred comonomer e) is 1-(isocyanato-1-methyl)-3-(methylethyl)benzene.

It is preferable to use from 0 to 20% by weight of comonomers e), particularly from 0 to 15% by weight, based in each case on the total weight of the monomers for the preparation of the parent polymers.

Additional monomers that can also be used for the preparation of the parent polymers are one or more silane monomers f). Suitable silane monomers f) are polymerizable silanes and, respectively, mercaptosilanes, in hydrolyzed form. Preference is given to gamma-acryl- and, respectively, gamma-methacryloxy-propyltri(alkoxy)silanes, α-methacryloxymethyltri(alkoxy)silanes, gamma-methacryloxypropylmethyldi(alkoxy)silanes, vinylalkyldi(alkoxy)silanes, and vinyltri(alkoxy)silanes, where examples of alkoxy groups that can be used are methoxy, ethoxy, propoxy, isopropoxy, methoxyethylene, and ethoxyethylene moieties, methoxypropylene glycol ether moieties, or ethoxy-propylene glycol ether moieties. Examples here are vinyltrimethoxysilane, vinyltriethoxysilane, vinyltripropoxysilane, vinyltriisopropoxysilane, vinyltris(1-methoxy)-isopropoxysilane, vinyltributoxysilane, vinyltriacetoxysilane, 3-methacryloxypropyltrimethoxysilane, 3-methacryloxypropyltriethoxysilane, 3-methacryloxypropylmethyldimethoxysilane, 3-methacryloxypropylmethyldiethoxysilane, methacryloxymethyl-trimethoxysilane, methacryloxymethyltriethoxysilane, 3-methacryloxypropyltris(2-methoxyethoxy)silane, vinyltrichlorosilane, vinylmethyldichlorosilane, vinyltris(2-methoxyethoxy)-silane, trisacetoxyvinylsilane, and 3-(triethoxysilyl)propyl-succinic anhydride. Preference is also given to 3-mercaptopropyltrimethoxysilane, 3-mercaptopropyltriethoxysilane, methacryloxymethyltriethoxysilane, and 3-mercaptopropylmethyl-dimethoxysilane. The silane monomers f) preferably contain no silicone macromer units such as silicone macromer units having at least 10 siloxane repeat units. The parent polymers and, respectively, the crosslinkable vinyl ester copolymers therefore preferably contain no silicone macromer units.

The proportion generally used of the silane monomers f) is up to 10% by weight, based on the total weight of the monomers for the preparation of the parent polymers.

Parent polymers are preferably obtainable by free-radical-initiated polymerization of one or more vinyl esters a) selected from the group consisting of vinyl acetate, vinyl pivalate, vinyl laurate, VeoVa9®, VeoVa10®, and VeoVa11®, and one or more ethylenically unsaturated, epoxy-functional monomers b) selected from the group consisting of glycidyl acrylate, glycidyl methacrylate (GMA), or allyl glycidyl ether, and, if appropriate, one or more monomers c) selected from the group of the (meth)acrylic esters, such as in particular methyl acrylate, methyl methacrylate, ethyl acrylate, n- and tert-butyl acrylate, 2-ethylhexyl acrylate, isobornyl acrylate, and stearyl acrylate, from the group of the dienes, such as in particular isoprene or 1,3-butadiene, from the group of the olefins, such as in particular ethene, propene, or styrene, and from the group of the vinyl halides, such as in particular vinyl chloride or vinylidene chloride, and, if appropriate, one or more monomers d) selected from the group consisting of acrylic acid, methacrylic acid, crotonic acid, fumaric acid, maleic acid, 2-hydroxyethyl acrylate, 2-hydroxyethyl methacrylate, and, if appropriate, one or more monomers e), and, if appropriate, one or more silane monomers f).

The molar masses Mn of the parent polymers are preferably from 6500 to 300 000 g/mol, particularly preferably from 10 000 to 100 000 g/mol, and most preferably from 15 000 to 80 000 g/mol.

For the polymer-analogous reaction of the parent polymers, it is preferable to use one or more ethylenically unsaturated acids g) selected from the group of the ethylenically unsaturated carboxylic acids or their salts, in particular of the ethylenically unsaturated mono- and dicarboxylic acids or their salts, encompassing acrylic acid, methacrylic acid, crotonic acid, 2-hydroxyethyl acrylate, 2-hydroxyethyl methacrylate, fumaric acid, or maleic acid; monoesters of fumaric acid or of maleic acid, preferably their ethyl or isopropyl esters; or else long-chain unsaturated fatty acids. It is particularly preferable to use acrylic acid, methacrylic acid, or crotonic acid.

The crosslinkable vinyl ester copolymers involve fully modified crosslinkable vinyl ester copolymers or partially modified crosslinkable vinyl ester copolymers. Fully modified crosslinkable vinyl ester copolymers are obtainable by reacting all of the epoxy-functional groups of the monomer units b) of the parent polymers with ethylenically unsaturated acids g) during the polymer-analogous reaction. Partially modified crosslinkable vinyl ester copolymers are obtainable by not reacting all of the epoxy-functional groups of the monomer units b) of the parent polymers with ethylenically unsaturated acids g) during the polymer-analogous reaction. The partially modified crosslinkable vinyl ester copolymers therefore at least have functionalization with ethylenically unsaturated groups of the acids g) and with epoxy groups of the unreacted monomer units b).

It is preferable that from 10 to 100% of the monomer units b) present in the crosslinkable vinyl ester copolymers have been modified with ethylenically unsaturated acids g).

Crosslinkable groups of the crosslinkable vinyl ester copolymers are not only the ethylenically unsaturated groups of the units g) but also the functional groups of the optional monomer units d) to f), and, in the case of partially modified crosslinkable vinyl ester copolymers, also the epoxy groups of the monomer units b).

The crosslinkable vinyl ester copolymers preferably have, per 1000 g/mol of molar mass Mn, from 0.001 to 100 crosslinkable groups, particularly from 0.01 to 50, very particularly from 0.1 to 10, and most preferably from 0.1 to 5.

The invention further provides a process for the preparation of the crosslinkable vinyl ester copolymers via free-radical-initiated polymerization of
a) one or more vinyl esters and
b) one or more ethylenically unsaturated, epoxy-functional monomers, and
subsequent polymer-analogous reaction of the resultant parent polymers with one or more ethylenically unsaturated acids g), so that at least one ethylenically unsaturated, polymerizable group is introduced per parent polymer, wherein the molar masses Mn of the crosslinkable vinyl ester copolymers are ≥6500 g/mol.

The parent polymers are obtained by free-radical bulk, suspension, emulsion, or solution polymerization processes using the monomers a) and b), and also, if appropriate, the monomers c) to f), in the presence of free-radical initiators. The parent polymers are preferably prepared by bulk or solution polymerization processes.

In the solution polymerization process, the solvent used preferably comprises an organic solvent or a mixture of organic solvents, or a mixture of one or more organic solvents and water. Preferred solvents or preferred solvent components in solvent mixtures are selected from the class of the alcohols, ketones, esters, ethers, aliphatic hydrocarbons, aromatic hydrocarbons, and water. Particularly preferred solvents are aliphatic alcohols having from 1 to 6 carbon atoms, e.g. methanol, ethanol, n-propanol or isopropanol, ketones, such as acetone or methyl ethyl ketone, esters, such as methyl acetate, ethyl acetate, propyl acetate, or butyl acetate, or water. Most preference is given to methanol, isopropanol, methyl acetate, ethyl acetate, and butyl acetate.

The reaction temperature for the preparation of the parent polymers is from 20° C. to 160° C., preferably from 40° C. to 140° C.

The polymerization reaction is generally carried out at reflux at atmospheric pressure. In the case of copolymerization of gaseous monomers, such as ethylene, operations are carried out at room temperature under pressure, generally at from 1 to 100 bar.

Examples of suitable free-radical initiators are oil-soluble initiators, such as tert-butyl 2-ethylperoxyhexanoate, tert-butyl peroxypivalate, tert-butyl peroxyneodecanoate, dibenzoyl peroxide, tert-amyl peroxypivalate, di(2-ethylhexyl) peroxydicarbonate, 1,1-bis(tert-butylperoxy)-3,3,5-trimethyl-cyclohexane, and di(4-tert-butylcyclohexyl)peroxydicarbonate. Azo initiators are also suitable, an example being azobisiso-butyronitrile. The amount generally used as the initiators is from 0.005 to 3.0% by weight, preferably from 0.01 to 1.5% by weight, based in each case on the total weight of the monomers for the preparation of the parent polymers.

Adjustment of molar mass and of degree of polymerization is known to the person skilled in the art. By way of example, it can be achieved via addition of regulator, via the ratio of solvent to monomers, via variation of initiator concentration, via variation in the monomer feed, and via variation of the polymerization temperature. Examples of regulators or chain-transfer agents are alcohols, such as methanol, ethanol, and isopropanol, or aldehydes or ketones, such as acetaldehyde, propionaldehyde, butyraldehyde, acetone, or methyl ethyl ketone, or else compounds containing mercapto groups, e.g. dodecyl mercaptan, mercaptopropionic acid, or silicones containing mercapto groups.

The polymerization reaction can be carried out by using an initial charge comprising all of the reaction mixture constituents or comprising individual reaction mixture constituents, or by dividing the materials into an initial charge and feed(s) comprising all of the reaction mixture constituents, or comprising individual reaction mixture constituents, or by using the feed method with no initial charge. In a preferred procedure, part of the entire amount of vinyl ester a) and of monomers b), and also, if appropriate, of monomers c), d), e), and f), and part of the solvent and of regulator and of initiator are used as an initial charge, and the remaining amount of vinyl ester a) and of monomers b), and also, if appropriate, of monomers c), d), e), and f), and of the solvent and of regulator and of initiator are used as feed(s). If a batch process is carried out, all of the monomers, solvents, and regulators, and part of the initiator, are used as an initial charge, and the remainder of the initiator is added either all at once or in the form of feed(s).

The suspension, emulsion, or solution polymerization process is generally carried out as far as a solids content of from 15 to 99.5%, preferably as far as a solids content of from 40 to 99%.

Once the polymerization reaction has been concluded, known methods of post-polymerization can be used to remove residual monomer. Volatile residual monomers and other volatile constituents can also be removed by distillation or stripping methods, preferably under reduced pressure.

The residual monomer content of the parent polymers is preferably ≤5% by weight, particularly preferably ≤2% by weight, and most preferably ≤1% by weight.

The crosslinkable vinyl ester copolymers are finally obtained via polymer-analogous reaction of the parent polymers with one or more ethylenically unsaturated acids g).

The polymer-analogous reactions can be carried out directly in the solvents or solvent mixtures in which the corresponding parent polymers are prepared, as long as the ethylenically unsaturated acids g) selected for polymer-analogous reactions have adequate solubility and stability in said solvents or solvent mixtures. Otherwise, after preparation of the parent polymers, the solvent or the solvent mixture can be removed and the polymer-analogous reaction can be carried out after addition of an inert solvent or solvent mixture. Suitable inert solvents or solvent components in solvent mixtures for polymer-analogous reactions are aliphatic or aromatic hydrocarbons, alcohols, ketones, or ethers or esters, preferably xylene, toluene, methanol, ethanol, isopropanol, acetone, methyl ethyl ketone, methyl acetate, ethyl acetate, or butyl acetate.

As an alternative, the polymer-analogous reactions of the parent polymers with ethylenically unsaturated acids g) can also take place in the melt. For this, the solvents or solvent mixtures used for the preparation of the corresponding parent polymers are removed prior to the polymer-analogous reaction. A precondition for rapid conversions in the melt is that the melt viscosities of the polymers are not excessively high, preferably being ≤10 000 Pa·s at 135° C.

The polymer-analogous reactions are preferably carried out in the temperature range from 40 to 180° C., preferably from 90 to 150° C.

The glass transition temperature Tg and molar mass Mw or Mn of the crosslinkable vinyl ester copolymers can be adjusted in a known manner via the selection of the monomers a) to g) and their proportions, based on the total weight of the crosslinkable vinyl ester copolymers, and also via the polymerization conditions during the preparation of the parent polymers, for example via the initiator concentration, polymerization temperature, regulator and regulator concentration, and also solvent and solvent content. The glass transition temperature Tg of the crosslinkable vinyl ester copolymers is preferably ≥−100° C., and particularly preferably ≥−100° C. and ≤150° C., and most preferably ≥−70° C. and ≤150° C.

The content of residual monomers in the crosslinkable vinyl ester copolymers is preferably ≥5% by weight, particularly preferably ≥2% by weight, and most preferably ≥1% by weight.

The crosslinkable vinyl ester copolymers can be crosslinked with themselves or with other organic or inorganic substances, via addition of initiators or catalysts. The crosslinking can also be brought about via electron beams, or in the presence of suitable initiators via UV radiation. The crosslinking takes place at room temperature or at an elevated temperature.

A particular feature of the crosslinkable vinyl ester copolymers, by virtue of their polymer structure and of their high molar mass Mn, is high crosslinking rates, even at low contents of crosslinkable groups per polymer chain. Among the crosslinkable groups here, it is particularly the ethylenically unsaturated groups of the units g) that are crosslinked at high crosslinking rates. The high crosslinking rate is evident by way of example in a very rapid rise in viscosity during the crosslinking reaction.

The crosslinking rate can be controlled via the temperature, the half-life times of the initiators, use of initiator accelerators, or initiator concentration. The initiators used for the UV crosslinking reaction comprise UV initiators known to the person skilled in the art.

By virtue of their different functional groups, partially modified crosslinkable vinyl ester copolymers can undergo linkage by dual crosslinking, using substrates. Dual crosslinking is the occurrence of two different crosslinking mechanisms, e.g. free-radical and thermal crosslinking mechanisms. These different crosslinking mechanisms can proceed simultaneously or in succession. This method can be used to influence the adhesion properties of the crosslinkable vinyl ester copolymers on substrates.

The monomer units a) to f) of the parent polymers and, respectively, the monomer units a) to g) of the crosslinkable vinyl ester copolymers are completely compatible with one another, and do not lead to any undesired crosslinking. Crosslinking does not occur until a crosslinking catalyst is added. The parent polymer and the crosslinkable vinyl ester copolymers are therefore storage-stable.

The crosslinkable vinyl ester copolymers are suitable for the coating of textiles, of paper, of foils, and of metals, for example in the form of protective coating or of antifouling coating. Another application sector is protection of buildings, in particular for the production of weathering-resistant coatings or sealants. The crosslinkable vinyl ester copolymers are also suitable as modifiers and as additive in plastics processing, packaging industry, and can by way of example provide an oxygen barrier.

The crosslinkable vinyl ester copolymers can also be used as low-profile additive (LPA). Low-profile additives are added during the production of sheet-like plastics parts by thermal curing of unsaturated polyester resin compositions (UP resins), in order to reduce, or compensate, the volume shrinkage occurring during this process. The low-profile additive reduces shrinkage during hardening, eliminates internal stresses, reduces microcracking, and makes it easier to comply with manufacturing tolerances.

For the application as low-profile additive, the crosslinkable vinyl ester copolymers are generally dissolved in styrene and applied, if appropriate with other additives, such as fillers, thickeners, initiators, and processing aids. The crosslinkable vinyl ester copolymers can also be used in combination with conventional low-profile additives. By way of example, combination with polyvinyl acetate, carboxy-functional polyvinyl acetates, and polymethyl methacrylate can be used.

Unsaturated polyester resin compositions usually used are reaction products of a dicarboxylic acid or of a dicarboxylic anhydride with a polyol. These polyester resin compositions usually also comprise one or more monomers having ethylenically unsaturated groups, generally styrene. Styrene is added to the polyester resin composition in order to dissolve the polyester and in order to ensure that the polyester composition is flowable. The polyester resin compositions also comprise fiber materials, such as glass fiber, carbon fiber, or corresponding fiber mats (fiber reinforced plastic composites=FRP composites), for reinforcement of the plastics parts obtained using the polyester resin composition.

The crosslinkable vinyl ester copolymers can be used as low-profile additives for any of the familiar production processes for FRP composites, for example for sheet molding compound technology (SMC), bulk molding compound technology (BMC), resin transfer molding (RTM), or resin injection molding (RIM). In the BMC process, the constituents of the compounded material: the styrenic polyester resin solution, the low-profile additive, the crosslinking catalyst, filler, mold-release agent, and also, if appropriate, other additives, are mixed to give a paste, and then glass fiber is added, and then the molding is produced by applying pressure and heat. By way of example, this technology is used to produce reflectors for automobile headlamps. The SMC process is analogous to the BMC process in preparing a paste from styrenic polyester resin solution, low-profile additive, crosslinking catalyst, filler, mold-release agent, and also, if appropriate, other additives, and the paste is applied to a polyamide film. Glass fiber is then spread onto this layer, and finally a further layer of the paste is applied. This sheet-like sandwich is then peeled away from the film, cut into pieces, and pressed to give moldings with application of pressure and heat. Moldings produced by means of this technology are used by way of example as tailgates of automobiles.

The composition of the formulations, and also the amounts used of the low-profile additives, depend on the production process selected, and are known to the person skilled in the art. The crosslinkable vinyl ester copolymers are generally applied in a styrene solution of strength from 10 to 50% by weight. The amount used is generally from 5 to 50 parts by weight, preferably from 30 to 40 parts by weight, of the solution, based on the entire formulation.

Use of crosslinkable vinyl ester copolymers as polymer additive, for example as LPA, gives plastics parts with improved mechanical properties (e.g. improved flexural strength).

The examples below serve for further explanation of the invention, but do not restrict it in any way.

Preparation Of Parent Polymers

EXAMPLE 1

307.0 g of ethyl acetate, 50.0 g of vinyl acetate, 0.5 g of glycidyl methacrylate, and 1.6 g of PPV (tert-butyl perpivalate, 75% strength solution in aliphatics) were used as initial charge in a 2 l stirred glass vessel with anchor stirrer, reflux condenser, and feed equipment. The initial charge was then heated to 70° C. under nitrogen, using a stirrer rotation rate of 200 rpm. Once the internal temperature of 70° C. had been reached, 1150.0 g of vinyl acetate, 12.0 g of glycidyl methacrylate, and initiator solution (14.8 g of PPV) were fed. The monomer solution was fed within a period of 240 minutes, and the initiator solution was fed within a period of 300 minutes. Once the initiator feeds had ended, polymerization was continued for a further 2 hours at 80° C. A clear polymer solution was obtained with 79% by weight solids content. The ethyl acetate was removed by distillation in vacuo at an elevated temperature. The dried film made from ethyl acetate solution (layer thickness 70 micrometers) was clear. The copolymer had 1% by weight glycidyl methacrylate content (reactive comonomer b)), based on the total weight of the monomers used. The polymer had less than 0.5% by weight residual monomer content, based on the total weight of the polymer. The other properties of the polymer are listed in table 1.

EXAMPLE 2

By analogy with the procedure of example 1, a copolymer was obtained from 97% by weight of vinyl acetate and 3% by weight of glycidyl methacrylate. The polymer had less than 0.5% by weight residual monomer content, based on the total weight of the polymer. The other properties of the polymer are listed in table 1.

EXAMPLE 3

By analogy with the procedure of example 1, a copolymer was obtained from 97% by weight of vinyl acetate and 3% by weight of glycidyl methacrylate. Unlike in example 1, however, 247 g of isopropanol were used instead of ethyl acetate. The polymer had less than 0.5% by weight residual monomer content, based on the total weight of the polymer. The other properties of the polymer are listed in table 1.

EXAMPLE 4

By analogy with the procedure of example 1, a copolymer was obtained from 95% by weight of vinyl acetate and 5% by weight of glycidyl methacrylate. The polymer had less than 0.5% by weight residual monomer content, based on the total weight of the polymer. The other properties of the polymer are listed in table 1.

EXAMPLE 5

By analogy with the procedure of example 1, a copolymer was obtained from 94% by weight of vinyl acetate and 6% by weight of glycidyl methacrylate. The polymer had less than 0.5% by weight residual monomer content, based on the total weight of the polymer. The other properties of the polymer are listed in table 1.

EXAMPLE 6

By analogy with the procedure of example 1, a copolymer was obtained from 90% by weight of vinyl acetate and 10% by weight of glycidyl methacrylate. The polymer had less than 0.5% by weight residual monomer content, based on the total weight of the polymer. The other properties of the polymer are listed in table 1.

EXAMPLE 7

By analogy with the procedure of example 1, a copolymer was obtained from 88% by weight of vinyl acetate and 12% by weight of glycidyl methacrylate. The polymer had less than 0.5% by weight residual monomer content, based on the total weight of the polymer. The other properties of the polymer are listed in table 1.

EXAMPLE 8

By analogy with the procedure of example 1, a copolymer was obtained from 98% by weight of vinyl acetate, 1% by weight of VeoVa9®, and 1% by weight of glycidyl methacrylate. The feed of the second monomer here was analogous to that of the main monomer in terms of quantitative proportions. The polymer had less than 0.5% by weight residual monomer content, based on the total weight of the polymer. The other properties of the polymer are listed in table 1.

EXAMPLE 9

By analogy with the procedure of example 8, a copolymer was obtained from 90% by weight of vinyl acetate, 9% by weight of VeoVa9®, and 1% by weight of glycidyl methacrylate. The polymer had less than 0.5% by weight residual monomer content, based on the total weight of the polymer. The other properties of the polymer are listed in table 1.

EXAMPLE 10

By analogy with the procedure of example 8, a copolymer was obtained from 76% by weight of vinyl acetate, 23% by weight of VeoVa9®, and 1% by weight of glycidyl methacrylate. The polymer had less than 0.5% by weight residual monomer content, based on the total weight of the polymer. The other properties of the polymer are listed in table 1.

EXAMPLE 11

By analogy with the procedure of example 8, a copolymer was obtained from 79% by weight of vinyl acetate, 15% by weight of vinyl laurate, and 6% by weight of glycidyl methacrylate. 1.0% by weight of acetaldehyde was also added to the initial charge in order to adjust molar mass. The polymer had less than 0.5% by weight residual monomer content, based on the total weight of the polymer. The other properties of the polymer are listed in table 1.

EXAMPLE 12

By analogy with the procedure of example 8, a copolymer was obtained from 74% by weight of vinyl acetate, 20% by weight of vinyl laurate, and 6% by weight of glycidyl methacrylate. 1.0% by weight of acetaldehyde was also added to the initial charge in order to adjust molar mass. The polymer had less than 0.5% by weight residual monomer content, based on the total weight of the polymer. The other properties of the polymer are listed in table 1.

EXAMPLE 13

By analogy with the procedure of example 8, a copolymer was obtained from 69% by weight of vinyl acetate, 25% by weight of vinyl laurate, and 6% by weight of glycidyl methacrylate. 1.0% by weight of acetaldehyde was also added to the initial charge in order to adjust molar mass. The polymer had less than 0.5% by weight residual monomer content, based on the total weight of the polymer. The other properties of the polymer are listed in table 1.

EXAMPLE 14

By analogy with the procedure of example 8, a copolymer was obtained from 59% by weight of vinyl acetate, 35% by weight of vinyl laurate, and 6% by weight of glycidyl methacrylate. 1.0% by weight of acetaldehyde was also added to the initial charge in order to adjust molar mass. The polymer had less than 0.5% by weight residual monomer content, based on the total weight of the polymer. The other properties of the polymer are listed in table 1.

EXAMPLE 15

By analogy with the procedure of example 1, a copolymer was obtained from 58% by weight of vinyl acetate, 35% by weight of vinyl laurate, and 6% by weight of glycidyl methacrylate, and 1% by weight of crotonic acid. The feed of the vinyl laurate and the crotonic acid here was analogous to that of the main monomer in terms of quantitative proportions. 1.0% by weight of acetaldehyde was also added to the initial charge in order to adjust molar mass. The polymer had less than 0.5% by weight residual monomer content, based on the total weight of the polymer. The other properties of the polymer are listed in table 1.

EXAMPLE 16

By analogy with the procedure of example 15, a copolymer was obtained from 58% by weight of vinyl acetate, 35% by weight of butyl acrylate, and 6% by weight of glycidyl methacrylate, and 1% by weight of crotonic acid. 15.0% by weight of isopropanol was also added to the initial charge in order to adjust molar mass. The polymer had less than 0.5% by weight residual monomer content, based on the total weight of the polymer. The other properties of the polymer are listed in table 1.

EXAMPLE 17

By analogy with the procedure of example 15, a copolymer was obtained from 58% by weight of vinyl acetate, 35% by weight of butyl acrylate, and 6% by weight of glycidyl methacrylate, and 1% by weight of acrylic acid. 4.5% by weight of butyraldehyde was also added to the initial charge in order to adjust molar mass. The polymer had less than 0.5% by weight residual monomer content, based on the total weight of the polymer. The other properties of the polymer are listed in table 1.

EXAMPLE 18

By analogy with the procedure of example 15, a copolymer was obtained from 58% by weight of vinyl acetate, 35% by weight of butyl acrylate, and 6% by weight of glycidyl methacrylate, and 1% by weight of hydroxyethyl acrylate. 3.0% by weight of acetaldehyde was also added to the initial charge in order to adjust molar mass. The polymer had less than 0.5% by weight residual monomer content, based on the total weight of the polymer. The other properties of the polymer are listed in table 1.

EXAMPLE 19

By analogy with the procedure of example 8, a copolymer was obtained from 78% by weight of vinyl acetate, 10% by weight of vinyl laurate, and 12% by weight of glycidyl methacrylate. 1.2% by weight of acetaldehyde was also added to the initial charge in order to adjust molar mass. The polymer had less than 0.5% by weight residual monomer content, based on the total weight of the polymer. The other properties of the polymer are listed in table 1.

EXAMPLE 22

By analogy with the procedure of example 19, a copolymer was obtained from 63% by weight of vinyl acetate, 25% by weight of vinyl laurate, and 12% by weight of glycidyl methacrylate. The polymer had less than 0.5% by weight residual monomer content, based on the total weight of the polymer. The other properties of the polymer are listed in table 1.

EXAMPLE 23

By analogy with the procedure of example 19, a copolymer was obtained from 58% by weight of vinyl acetate, 30% by weight of vinyl laurate, and 12% by weight of glycidyl methacrylate. The polymer had less than 0.5% by weight residual

TABLE 1

Compositions and properties of parent polymers:

| Ex. | VAc[b] | Monomer a)[b] | GMA[b] | Monomer c)[b] | Monomer d)[b] | H[c] [mPas] | K[d] | Mw[e] [kg/mol] | Mn[e] [kg/mol] |
|---|---|---|---|---|---|---|---|---|---|
| 1 | (99) | — | (1) | — | — | 5.1 | 40.1 | — | — |
| 2 | (97) | — | (3) | — | — | 7.4 | 45.1 | 138 | 28 |
| 3 | (97) | — | (3) | — | — | 2.2 | 24.8 | 25 | 13 |
| 4 | (95) | — | (5) | — | — | 8.6 | 44.7 | 149 | 21 |
| 5 | (94) | — | (6) | — | — | 9.1 | 48.2 | 185 | 23 |
| 6 | (90) | — | (10) | — | — | 11.7 | 54.1 | 350 | 40 |
| 7 | (88) | — | (12) | — | — | 12.1 | 55.4 | 373 | 41 |
| 8 | (98) | VV9 (1) | (1) | — | — | 6.1 | 42.1 | — | — |
| 9 | (90) | VV9 (9) | (1) | — | — | 6.0 | 42.2 | — | — |
| 10 | (76) | VV9 (23) | (1) | — | — | 6.1 | 42.6 | — | — |
| 11 | (79) | VL (15) | (6) | — | — | 2.3 | 28.3 | 44 | 12 |
| 12 | (74) | VL (20) | (6) | — | — | 2.5 | 28.2 | 45 | 14 |
| 13 | (69) | VL (25) | (6) | — | — | 2.7 | 28.9 | 48 | 14 |
| 14 | (59) | VL (35) | (6) | — | — | 2.8 | 28.8 | 56 | 15 |
| 15 | (58) | VL (35) | (6) | — | CA (1) | 2.5 | 27.2 | — | — |
| 16 | (58) | — | (6) | BA (35) | CA (1) | 5.1 | 38.6 | 119 | 20 |
| 17 | (58) | — | (6) | BA (35) | AA (1) | 3.7 | 33.7 | 78 | 19 |
| 18 | (58) | — | (6) | BA (35) | HEA (1) | 2.3 | 26.9 | 49 | 16 |
| 19 | (78) | VL (10) | (12) | — | — | 3.1 | 31.1 | 54 | 18 |
| 20 | (73) | VL (15) | (12) | — | — | 3.1 | 32.0 | — | — |
| 21 | (68) | VL (20) | (12) | — | — | 3.1 | 33.3 | — | — |
| 22 | (63) | VL (25) | (12) | — | — | 3.2 | 32.2 | — | — |
| 23 | (58) | VL (30) | (12) | — | — | 3.1 | 31.8 | — | — |
| 24 | (53) | VL (35) | (12) | — | — | 3.7 | 33.8 | — | — |

[a]The % by wt. data are based on the total weight of the parent polymer.
[b]VAc: vinyl acetate; VV9: VeoVa9[R]; VL: vinyl laurate; GMA: glycidyl methacrylate; BA: n-butyl acrylate; CA: crotonic acid; AA: acrylic acid; HEA: hydroxyethyl acrylate.
[c]H: Höppler viscosity: determined to DIN 53015 (10% in ethyl acetate at 20° C.).
[d]K: K value: determined to DIN EN ISO 1628-2 (1% by wt. in acetone).
[e]Mw: weight-average molar mass, Mn: number-average molar mass.

EXAMPLE 20

By analogy with the procedure of example 19, a copolymer was obtained from 73% by weight of vinyl acetate, 15% by weight of vinyl laurate, and 12% by weight of glycidyl methacrylate. The polymer had less than 0.5% by weight residual monomer content, based on the total weight of the polymer. The other properties of the polymer are listed in table 1.

EXAMPLE 21

By analogy with the procedure of example 19, a copolymer was obtained from 68% by weight of vinyl acetate, 20% by weight of vinyl laurate, and 12% by weight of glycidyl methacrylate. The polymer had less than 0.5% by weight residual monomer content, based on the total weight of the polymer. The other properties of the polymer are listed in table 1.

monomer content, based on the total weight of the polymer. The other properties of the polymer are listed in table 1.

EXAMPLE 24

By analogy with the procedure of example 19, a copolymer was obtained from 53% by weight of vinyl acetate, 35% by weight of vinyl laurate, and 12% by weight of glycidyl methacrylate. The polymer had less than 0.5% by weight residual monomer content, based on the total weight of the polymer. The other properties of the polymer are listed in table 1.

Polymer-Analogous Reactions of the Parent Polymers to Give the Crosslinkable Vinyl Ester Copolymers:
Polymer-Analogous Reactions in a Solvent:

EXAMPLE 25

300 g of the parent polymer from example 1 were dissolved in 300 g of butyl acetate in a 1 l reactor, and mixed with 0.3 g of catalyst (triphenylphosphine), and 0.1 g of inhibitor (hydroquinone), and stirred for about 15 minutes. 2 g of crotonic acid were then added, and the solution was heated to reflux temperature (~125° C.). After about 30 hours, the volatile constituents were removed in vacuo, and the product was isolated. The crosslinkable vinyl ester copolymer had less than 0.5% by weight residual monomer content, based on the total weight of the polymer. The other properties of the crosslinkable vinyl ester copolymer are listed in table 2.

EXAMPLE 26

300 g of the parent polymer from example 2 were reacted by analogy with the procedure of example 25, except that 6 g of crotonic acid and 0.9 g of catalyst (triphenylphosphine) were used. The crosslinkable vinyl ester copolymer had less than 0.5% by weight residual monomer content, based on the total weight of the polymer. The other properties of the crosslinkable vinyl ester copolymer are listed in table 2.

EXAMPLE 27

300 g of the parent polymer from example 3 were reacted by analogy with the procedure of example 25, except that 2 g of methacrylic acid and 0.9 g of catalyst (triphenylphosphine) were used. The crosslinkable vinyl ester copolymer had less than 0.5% by weight residual monomer content, based on the total weight of the polymer. The other properties of the crosslinkable vinyl ester copolymer are listed in table 2.

EXAMPLE 28

300 g of the parent polymer from example 4 were reacted by analogy with the procedure of example 25, except that 10 g of crotonic acid and 1.5 g of catalyst (triphenylphosphine) were used. The crosslinkable vinyl ester copolymer had less than 0.5% by weight residual monomer content, based on the total weight of the polymer. The other properties of the crosslinkable vinyl ester copolymer are listed in table 2.

EXAMPLE 29

300 g of the parent polymer from example 5 were reacted by analogy with the procedure of example 25, except that 12 g of crotonic acid and 1.8 g of catalyst (triphenylphosphine) were used. The crosslinkable vinyl ester copolymer had less than 0.5% by weight residual monomer content, based on the total weight of the polymer. The other properties of the crosslinkable vinyl ester copolymer are listed in table 2.

EXAMPLE 30

300 g of the parent polymer from example 8 were reacted by analogy with the procedure of example 25. The crosslinkable vinyl ester copolymer had less than 0.5% by weight residual monomer content, based on the total weight of the polymer. The other properties of the crosslinkable vinyl ester copolymer are listed in table 2.

EXAMPLE 31

300 g of the parent polymer from example 9 were reacted by analogy with the procedure of example 25. The crosslinkable vinyl ester copolymer had less than 0.5% by weight residual monomer content, based on the total weight of the polymer. The other properties of the crosslinkable vinyl ester copolymer are listed in table 2.

EXAMPLE 32

300 g of the parent polymer from example 10 were reacted by analogy with the procedure of example 25. The crosslinkable vinyl ester copolymer had less than 0.5% by weight residual monomer content, based on the total weight of the polymer. The other properties of the crosslinkable vinyl ester copolymer are listed in table 2.

Polymer-Analogous Reaction in the Melt:

EXAMPLE 33

A solution obtained via polymerization as in example 11 with 79% by weight solids content and with an amount of 300 g of parent polymer was freed from ethyl acetate in vacuo at an elevated temperature. The remaining parent polymer was melted by heating to 135° C. 12 g of crotonic acid and 0.1 g of inhibitor (hydroquinone) were then added. After 5 hours, the volatile constituents were removed in vacuo, and the melt was cooled. The crosslinkable vinyl ester copolymer had less than 0.5% by weight residual monomer content, based on the total weight of the polymer. The other properties of the crosslinkable vinyl ester copolymer are listed in table 2.

EXAMPLEs 34 to 40

By analogy with example 33, in each case 300 g of the parent polymers from examples 12 to 18 were reacted. In each case, the crosslinkable vinyl ester copolymer had less than 0.5% by weight residual monomer content, based on the total weight of the polymer. The other properties of the respective crosslinkable vinyl ester copolymers are listed in table 2.

TABLE 2

| | | Crosslinkable vinyl ester copolymers: | | | |
|---|---|---|---|---|---|
| Ex. | Parent polymer | Monomer g)[a] ([% by wt.]) | TPP[b] [% by wt.] | H[c] [mPas] | K[d] | Mn[e] [kg/mol] |
| 25 | 1 | CA (0.7) | 0.1 | 5.6 | 42.1 | 30 |
| 26 | 2 | CA (2.0) | 0.3 | 8.5 | 46.7 | 30 |
| 27 | 3 | MAA (0.7) | 0.3 | 2.3 | 25.1 | 13 |
| 28 | 4 | CA (3.3) | 0.5 | 9.1 | 46.8 | 21 |
| 29 | 5 | CA (4.0) | 0.6 | 10.5 | 50.4 | 25 |
| 30 | 8 | CA (0.7) | 0.1 | 7.6 | 44.1 | 20 |
| 31 | 9 | CA (0.7) | 0.1 | 7.3 | 43.5 | 19 |
| 32 | 10 | CA (0.7) | 0.1 | 7.1 | 43.4 | 19 |
| 33 | 11 | CA (4.0) | 0.6 | 2.9 | 33.0 | 13 |
| 34 | 12 | CA (4.0) | 0.6 | 3.2 | 32.7 | 14 |
| 35 | 13 | CA (4.0) | 0.6 | 3.5 | 32.9 | 15 |
| 36 | 14 | CA (4.0) | 0.6 | 3.2 | 32.4 | 16 |
| 37 | 15 | CA (4.0) | 0.6 | 5.8 | 41.9 | 19 |
| 38 | 16 | CA (4.0) | 0.6 | 8.6 | 45.8 | 22 |
| 39 | 17 | CA (4.0) | 0.6 | 6.2 | 42.5 | 20 |
| 40 | 18 | CA (4.0) | 0.6 | 3.8 | 35.4 | 17 |
| 41 | 19 | CA (8.0) | 1.2 | 7.7 | 42.8 | 18 |
| 42 | 20 | CA (8.0) | 1.2 | 6.7 | 42.1 | 19 |
| 43 | 21 | CA (8.0) | 1.2 | 6.3 | 41.9 | 21 |
| 44 | 22 | CA (8.0) | 1.2 | 7.1 | 43.1 | 20 |
| 45 | 23 | CA (8.0) | 1.2 | 5.9 | 41.8 | 19 |
| 46 | 24 | CA (4.0) | 0.6 | 7.3 | 43.7 | 20 |

[a]CA: Crotonic acid; MAA: methacrylic acid; the % by wt. data are based on the weight of the parent polymer.
[b]TPP: Triphenylphosphine; the % by wt. data are based on the weight of the parent polymer.
[c]H: Höppler viscosity: determined to DIN 53015 (10% in ethyl acetate at 20° C.).
[d]K: K value: determined to DIN EN ISO 1628-2 (1% by wt. in acetone).
[e]Mn: number-average molar mass.

EXAMPLE 41

300 g of the resin from example 19 were melted in a reactor at 135° C. 24 g of crotonic acid and 0.1 g of inhibitor (hydroquinone) were then added. After stirring for 15 minutes, 3.6 g of catalyst (triphenylphosphine) were added. After 5 hours, the volatile constituents were removed in vacuo, and the melt was cooled. The crosslinkable vinyl ester copolymer had less than 0.5% by weight residual monomer content, based on the total weight of the polymer. The other properties of the crosslinkable vinyl ester copolymer are listed in table 2.

EXAMPLES 42 to 46

In each case, 300 g of the parent polymers from examples 20 to 24 were reacted by analogy with example 41. In each case, the crosslinkable vinyl ester copolymer had less than 0.5% by weight residual monomer content, based on the total weight of the polymer. The other properties of the respective crosslinkable vinyl ester copolymers are listed in table 2.

The crosslinkable vinyl ester copolymers (table 2: examples 25 to 46) were obtained in the form of clear solutions or clear or transparent resins. No haze or gelling of the crosslinkable vinyl ester copolymers occurred. The crosslinkable vinyl ester copolymers were therefore in non-crosslinked form.

Storage Stability of the Crosslinkable Vinyl Ester Copolymers:

By way of example, the crosslinkable vinyl ester copolymer from example 33 was melted and kept at 135° C. for 4 h. Only a very small rise in Höppler viscosity of the crosslinkable vinyl ester copolymer was observed here (from an initial 33.0 mPa·s to 34.3 mPa·s). After cooling to room temperature, the crosslinkable vinyl ester copolymer was transparent and exhibited no sign of haze or gelling.

This examples provides evidence that, in the absence of crosslinking initiators, the crosslinkable vinyl ester copolymers are stable even under very harsh thermal conditions. Accordingly, storage stability over a period of more than 12 months is likely under standard conditions to DIN 50014.

Crosslinking Rate or Reactivity of the Crosslinkable Vinyl Ester Copolymers:

The crosslinking rates or reactivities of the crosslinkable vinyl ester copolymers correlate macroscopically with viscosity changes during the crosslinking reaction.

EXAMPLE 47

To provide evidence of the high crosslinking rates or high reactivities of the crosslinkable vinyl ester copolymers of the invention, finely ground copolymer from example 25 was mixed with 1% by weight of TBPIPC (tert-butylperoxy isopropyl carbonate at 10% strength in isopropanol; half-life time of 6 min at 137° C.), based on the weight of the polymer, and dried in vacuo at 30° C. (table 3).

Crosslinking was then undertaken under isothermal reaction conditions at a temperature of 135° C. The viscosity rise during the crosslinking reaction was determined by measurement of melt rheology using Bohlin CVO 120 HR equipment. The parallel-plate measurement system was selected. Complex melt viscosity was measured via oscillation at a frequency of 1 Hz and constant temperature.

The quotient calculated from the initial melt viscosity and viscosities during the crosslinking reaction is a measure of the degree of crosslinking and thus of the reactivity of the crosslinkable vinyl ester copolymers. By way of example, a viscosity rise by a factor of 3 was measured for the crosslinkable vinyl ester copolymer from example 25 within a period of 10 min at 135° C., i.e. the quotient obtained was 3.

$$\frac{\text{Melt viscosity after 10 min at 135° C.}}{\text{Initial melt viscosity}} = \text{Quotient}$$

For comparison, the parent polymer from example 1 was subjected to the same conditions, and no alteration in viscosity occurred here (quotient=1) (table 3, comparative example C51), i.e. no crosslinking occurred.

Example 47 and comparative example C51 illustrate the large and rapid viscosity rise of the composition of the invention during the crosslinking reaction. This provides evidence of the high crosslinking rate or reactivity of the crosslinkable vinyl ester copolymers of the invention.

In examples 48 to 50, the crosslinkable vinyl ester copolymers from examples 26, 28 and, respectively, 29 were used under the conditions mentioned in example 47. Examples 48 to 50 provide evidence that the crosslinking rates of the crosslinkable vinyl ester copolymers increase (table 3) with increasing number of crosslinkable groups.

TABLE 3

Quotient of melt viscosities:

| Ex. | Polymer from example | GMA content[a] [% by wt.] | Quotient |
| --- | --- | --- | --- |
| 47 | 25 | 1 | 3 |
| 48 | 26 | 3 | 8 |
| 49 | 28 | 5 | 17 |
| 50 | 29 | 6 | 28 |
| C51 | 1 | [—]1 | 1 |

[a]GMA: Glycidyl methacrylate; the % by wt. data are based on the total weight of the parent polymer.

Mechanical Properties of the Crosslinkable Vinyl Ester Copolymers:

The effect of the molar mass Mn of the crosslinkable vinyl ester copolymers of the mechanical properties was studied by using composite components produced from unsaturated polyester resins using crosslinkable vinyl ester copolymers as polymer additive.

Production of Test Specimen:

A mixture composed of 100 parts by weight of an unsaturated polyester resin (orthophthalic acid-maleic anhydride resin, 65% strength in styrene) with 1 part by weight of a cobalt accelerator (NL 49-P from Akzo Nobel), 1.5 parts by weight of an initiator (Butanox M 50 from Akzo Nobel) and, if appropriate, 2 parts by weight of polymer additive (table 4) was intimately mixed and poured into a mold. The test specimen (length/width/thickness=100 mm/15 mm/2 mm) was obtained after hardening for 24 hours at room temperature, 24 hours at 65° C., and 2 h at 100° C.

The flexural strength of the test specimen was determined to EN ISO 14125. Table 4 lists the test results for various composite components with various polymer additives.

A composite component without polymer additive (table 4, comparative example C52) was far inferior in its values for flexural strength to the composite components which comprised the crosslinkable vinyl ester copolymers of the invention as polymer additives (table 4, examples 57 to 78). Use of a low-molecular-weight vinyl acetate homopolymer as polymer additive led to a composite component with an even poorer value for flexural strength, similar to the value obtained without polymer additive (table 4, comparative examples C52 and C53). When the polymers used as polymer additives were of relatively high molecular weight or were crosslinkable, but were not polymers of the invention (table 4, comparative examples C54 to C56), the values achieved for flexural strength were smaller than when the crosslinkable vinyl ester copolymers of the invention were used (table 4, examples 57 to 78).

TABLE 4

Effect of molar masses Mn of the crosslinkable vinyl ester copolymers on the mechanical properties of composite components:

| Ex. | Polymer additive | K[a] | Mn[b] [kg/mol] | FS[c] [MPa] |
|---|---|---|---|---|
| C52 | — | — | — | 15 |
| C53 | Vinyl acetate homopolymer | 20.1 | 6.8 | 10 |
| C54 | Vinyl acetate-glycidyl methacrylate copolymer | 22.2 | 7 | 18 |
| C55 | Vinyl acetate homopolymer | 31.4 | 16 | 20 |
| C56 | Vinyl acetate homopolymer | 43.0 | 35 | 27 |
| 57 | Polymer from Ex. 25 | 42.1 | 30 | 43 |
| 58 | Polymer from Ex. 26 | 46.7 | 30 | 44 |
| 59 | Polymer from Ex. 27 | 25.1 | 13 | 37 |
| 60 | Polymer from Ex. 28 | 46.8 | 21 | 45 |
| 61 | Polymer from Ex. 29 | 50.4 | 25 | 46 |
| 62 | Polymer from Ex. 30 | 44.1 | 20 | 43 |
| 63 | Polymer from Ex. 31 | 43.5 | 19 | 42 |
| 64 | Polymer from Ex. 32 | 43.4 | 19 | 40 |
| 65 | Polymer from Ex. 33 | 33.0 | 13 | 52 |
| 66 | Polymer from Ex. 34 | 32.7 | 14 | 54 |
| 67 | Polymer from Ex. 35 | 32.9 | 15 | 55 |
| 68 | Polymer from Ex. 36 | 32.4 | 16 | 58 |
| 69 | Polymer from Ex. 37 | 41.9 | 19 | 60 |
| 70 | Polymer from Ex. 38 | 45.8 | 22 | 60 |
| 71 | Polymer from Ex. 39 | 42.5 | 20 | 58 |
| 72 | Polymer from Ex. 40 | 35.4 | 17 | 56 |
| 73 | Polymer from Ex. 41 | 42.8 | 18 | 61 |
| 74 | Polymer from Ex. 42 | 42.1 | 19 | 62 |
| 75 | Polymer from Ex. 43 | 41.9 | 21 | 63 |
| 76 | Polymer from Ex. 44 | 43.1 | 20 | 63 |
| 77 | Polymer from Ex. 45 | 41.8 | 19 | 64 |
| 78 | Polymer from Ex. 46 | 44.6 | 21 | 65 |

[a]K: K value: determined to DIN EN ISO 1628-2 (1% by wt. in acetone).
[b]Mn: number-average molar mass.
[c]FS: Flexural strength: determined to DIN EN ISO 14125.

The examples and comparative examples listed in table 4 show that when relatively high-molecular-weight polymers are used as polymer additives for composite components it is possible to achieve relatively high values for flexural strength. When the crosslinkable vinyl ester copolymers of the invention are used, particularly high values for flexural strengths are obtained.

Use of the Crosslinkable Vinyl Ester Copolymers as LPAs:

TABLE 5

Formulation for plastics parts:

| Type | Raw material | Pts. By wt. |
|---|---|---|
| Orthophthalic acid-maleic anhydride resin (UP resin) | UP resin (34.5% strength in styrene) | 65.5 |
| LPA1 or LPA2 | LPA (40% strength in styrene) | 30.0 |
| Styrene | Monostyrene | 4.5 |
| Trigonox ® C | tert-butyl peroxybenzoate | 1.5 |
| Byk ®-W 996 | Wetting and dispersion additive | 2.9 |
| p-Benzoquinone | Inhibitor (10% in MMA) | 0.7 |
| Akzo Nobel NL-49 | Accelerator (1% strength Co in ester) | 1.1 |
| Byk ®-9076 | Wetting and dispersion additive | 0.5 |
| 9257-45 carbon black | Black color paste | 10.0 |
| Millicarb ® OG | Chalk (CaCO3) | 200.0 |
| Subtotal | | 316.7 |

TABLE 5-continued

Formulation for plastics parts:

| Type | Raw material | Pts. By wt. |
|---|---|---|
| Luvatol ® MK35 | Thickener (35% strength MgO in UP) | 1.5 |
| Vetrotex P204 | Glass fiber | 85.9 |

The Low-Profile Additives Used Comprised:
LPA1 (Comparison):
Copolymer composed of vinyl acetate and 1% by weight of crotonic acid (molar mass Mn=31 kg/mol).
LPA2:
Crosslinkable vinyl ester copolymer from example 29.

The raw materials listed in table 5 were used to knead a paste. Shortly prior to processing, Luvatol MK 35, a thickener, was also incorporated by stirring. A laminate was then produced manually using the paste and the glass fibers, and processed to give an SMC. The product was stored at 20° C. and 50% humidity for 3 days. It was then pressed at 160° C. in a familiar SMC press to give a component.

Shrinkage was determined after cooling of the press, and volume change was determined in percent (table 6).

Minus values indicate that the component was larger than the original mold.

TABLE 6

| | x | | | y | | |
|---|---|---|---|---|---|---|
| | Allowance [mm] | Length [mm] | Shrinkage [‰] | Allowance [mm] | Length [mm] | Shrinkage [‰] |
| LPA1 | 0.397 | 457.392 | −0.42 | 0.456 | 457.451 | −0.55 |
| LPA2 | 0.342 | 457.344 | −0.33 | 0.411 | 457.402 | −0.43 |

Table 6 shows that crosslinkable vinyl ester copolymers and conventional, carboxy-functional polyvinyl acetates have comparable suitability as LPAs. In the formulation, both bring about expansion during pressing. The advantageous properties of the crosslinkable vinyl ester copolymers of the invention, e.g. high flexural strengths, also have an advantageous effect on the use of the crosslinkable vinyl ester copolymers of the invention as LPAs.

What is claimed is:
1. A crosslinkable vinyl ester copolymer obtained by free-radical-initiated polymerization of
 a) one or more vinyl esters and
 b) one or more ethylenically unsaturated, epoxy-functional monomers, and subsequent polymer-analogous reaction of the resultant parent polymer with one or more ethylenically unsaturated acids g), so that at least one ethylenically unsaturated, polymerizable group is introduced per parent polymer, wherein the molar mass Mn of the crosslinkable vinyl ester copolymer is ≥6500 g/mol;
 wherein the one or more vinyl esters a) constitute in a range from 20% to 99% by weight of all monomers used to prepare the parent polymer;
 wherein the polymer-analogous reaction is performed in the melt.
2. The crosslinkable vinyl ester copolymer as claimed in claim 1, wherein the vinyl ester(s) a) used comprise(s) one or more vinyl ester(s) of unbranched or branched alkyl carboxylic acids having from 1 to 20 carbon atoms.
3. The crosslinkable vinyl ester copolymer as claimed in claim 1, wherein the epoxy-functional monomers b) have from 1 to 20 carbon atoms, and the arrangement of these is linear or branched, and open-chain or cyclic.

4. The crosslinkable vinyl ester copolymer as claimed in claim 1, wherein the ethylenically unsaturated acids g) are selected from the group consisting of ethylenically unsaturated carboxylic acids and their salts.

5. The crosslinkable vinyl ester copolymer as claimed in claim 1, wherein the copolymer has from 0.001 to 100 crosslinkable groups per molar mass Mn of 1000 g/mol.

6. The crosslinkable vinyl ester copolymer as claimed in claim 1, wherein the content of residual monomers based on the total weight of the crosslinkable vinyl ester copolymer is ≤5% by weight.

7. A process for the preparation of a crosslinkable vinyl ester copolymer, comprising free-radical-initiated polymerization of
   a) one or more vinyl esters and
   b) one or more ethylenically unsaturated, epoxy-functional monomers, and subsequent polymer-analogous reaction of the resultant parent polymer with one or more ethylenically unsaturated acids g), so that at least one ethylenically unsaturated, polymerizable group is introduced per parent polymer, wherein the molar mass Mn of the crosslinkable vinyl ester copolymer is ≥6500 g/mol;
   wherein the polymer-analogous reaction is performed in the melt, 8. A coating for a textile, paper, foil or metal comprising the crosslinkable vinyl ester copolymer of claim 1.

9. A plastic comprising the crosslinkable vinyl ester copolymer of claim 1 as a modifier or an additive.

10. A composite component comprising the crosslinkable vinyl ester copolymer of claim 1 as an additive.

11. A plastic part prepared by curing a composition comprising an unsaturated polyester resin and the crosslinkable vinyl ester copolymer of claim 1 included as a low-profile additive.

12. The crosslinkable vinyl ester copolymer as claimed in claim 1, wherein one or more ethylenically unsaturated monomers c) are additionally included in the free-radical-initiated polymerization, said monomers c) being selected from the group consisting of acrylic esters and methacrylic esters of unbranched or branched alcohols having from 1 to 20 carbon atoms, vinylaromatics, olefins, dienes, and vinyl halides;
   wherein the one or more ethylenically unsaturated, epoxy-functional monomers b) constitute in a range from 0.2 to 15% by weight of all monomers used to prepare the parent polymer, and wherein the one or more ethylenically unsaturated monomers c) constitute in a range from 0 to 70% by weight of all monomers used to prepare the parent polymer.

13. The crosslinkable vinyl ester copolymer as claimed in claim 1, wherein the molar mass Mn of the crosslinkable vinyl ester copolymer is in a range from 10,000 g/mol to 100,000 g/mol.

14. The process as claimed in claim 7, wherein the molar mass Mn of the crosslinkable vinyl ester copolymer is in a range from 10,000 g/mol to 100,000 g/mol.

* * * * *